Aug. 8, 1967  E. D. SIGL  3,334,811
PLANETARY REVERSING COUNTER
Filed April 28, 1966  3 Sheets-Sheet 1

Inventor:
Edward D. Sigl,
by Hood, Gust & Irish
Attorneys.

Aug. 8, 1967   E. D. SIGL   3,334,811
PLANETARY REVERSING COUNTER
Filed April 28, 1966
3 Sheets-Sheet 2

Inventor:
Edward D. Sigl,
by Hood, Just & Onsh
Attorneys.

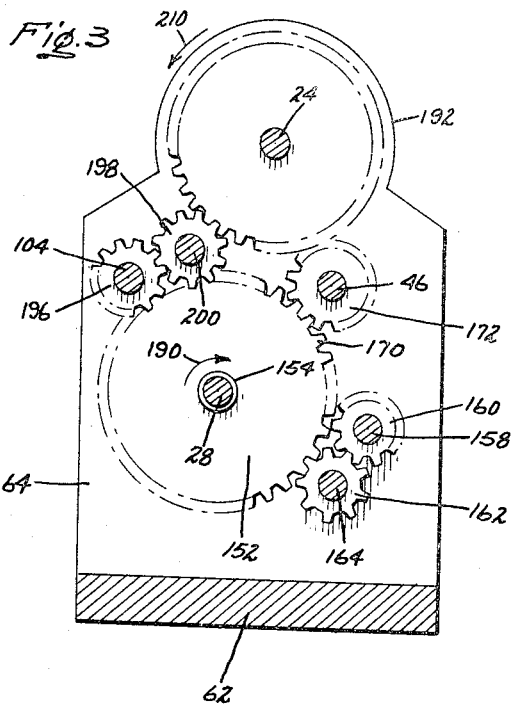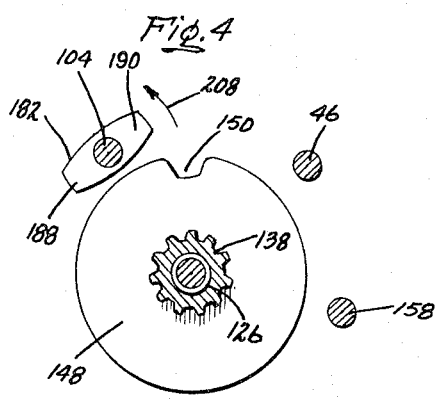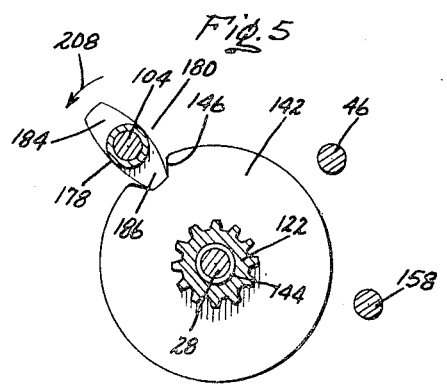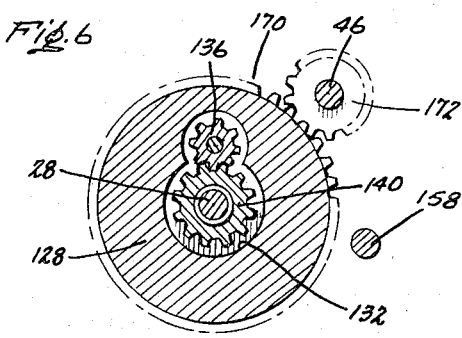

United States Patent Office 3,334,811
Patented Aug. 8, 1967

3,334,811
PLANETARY REVERSING COUNTER
Edward D. Sigl, Fort Wayne, Ind., assignor to Bowmar Instrument Corporation, Fort Wayne, Ind., a corporation of Indiana
Filed Apr. 28, 1966, Ser. No. 545,915
7 Claims. (Cl. 235—103)

This invention relates generally to revolution counters, and more particularly to revolution counters which automatically reverse the direction of counting at each extremity of a predetermined count.

Revolution counters conventionally comprise a plurality of number wheels, each bearing indicia in the form of digits of a respective order of the maximum number capable of being counted. The number wheel having the digits of the lowest order thereon is driven by the source of revolutions to be counted and intermittent motion-transferring mechanisms, such as two-tooth gears with cooperating locking cams and mutilated pinions, respectively interconnect the number wheels bearing the digits of successively higher orders so that each successive higher order number wheel is advanced a predetermined incremental amount in response to predetermined rotation of the next lower order number wheel.

In certain computers employed for navigational purposes, revolution counters are employed for the read-out of such data as longitude, latitude and deviation. In the case of latitude, the read-out provided by the counter must be from zero degree (0°) to ninety degrees (90°) north or south, i.e., on either side of the equator, and in the case of longitude, the read-out must be from zero degree (0°) to one hundred and eighty degrees (180°) east or west, i.e., on either side of the Greenwich meridian. An aircraft or vessel upon which the navigational computer is employed may very well, while traveling on a continuous straight-line course, cross the equator or the Greenwich meridian, as the case may be, and thus the output shaft of the latitude or longitude portion of the computer will continue to rotate in the same direction despite the fact that the equator or Greenwich meridian has been crossed. Thus, the counter with continuous input shaft rotation in the same direction must be capable of reversing its count, i.e., counting down from 180°00′ to 000°00′ as the aircraft or vessel moves from one hemisphere into the other hemisphere, and then counting back up from 000°00′ toward 180°00′ as the aircraft or vessel continues in the same direction through the other hemisphere.

Application Ser. No. 186,168 of Lowell D. Temple, assigned to the assignee of the present application, discloses an automatically reversing revolution counter in which a sliding shift mechanism interconnects the input shaft and the number wheels, and another timing revolution counter comprising successively higher order transfer mechanisms is provided driven by the input shaft and arranged to actuate the sliding shift mechanism, thereby to reverse the direction of rotation of the number wheels at the extremities of the desired count. The arrangement, while providing entirely adequate reversal of the direction of counting, employs a driving member which must be shifted axially out of engagement with a member rotating in one direction and into engagement with another member simultaneously rotating in the opposite direction, thus introducing problems of phasing and sliding friction, particularly where high speed operation is desired. It is therefore desirable to provide an automatically reversing counter of the type employing an auxiliary timing counter in which reversal is accomplished by planetary-type gearing, thus eliminating the use of an axially shiftable driving member and the accompanying problems aforesaid.

A reversing counter employing planetary-type gearing is disclosed in Patent No. 3,190,552 to R. H. Devanney, however that arrangement employs planetary gear trains incorporating internal gearing (as opposed to external gearing, i.e., spur gears). Revolution counters intended for airborne applications must of necessity be highly miniaturized and furthermore are generally required to operate at high speed. Operation of internal gearing in miniature sizes at high speed has been found to be unsatisfactory, due primarily to the difficulty of casting or molding and machining such internal gearing with the requisite precision. It is therefore desirable to provide an automatically reversing revolution counter of the planetary type incorporating spur gearing, thus permitting the employment of miniature precision parts and in turn permitting high speed operation.

It is therefore an object of this invention to provide an improved automatically reversing revolution counter.

Another object of the invention is to provide an improved automatically reversing revolution counter of the type incorporating planetary gearing.

A further object of the invention is to provide an improved automatically reversing revolution counter of the planetary type incorporating spur gearing.

The invention in its broader aspects provides reversing revolution counter apparatus having an input shaft adapted for continuous rotation in either direction and a display revolution counter for counting and indicating revolutions of the input shaft. The display counter includes a plurality of successively higher order number display wheels and a first plurality of intermittent motion transfer means respectively interconnecting the number wheels. A timing revolution counter is provided for counting revolutions of the input shaft and includes a plurality of successively higher order timing wheels and a second plurality of intermittent motion transfer means respectively interconnecting the timing wheels. A final intermittent motion transfer means is provided coupled to the highest order timing wheel and the input shaft is coupled to the lowest order timing wheel for rotating the same. Reversing mechanism is provided coupling the input shaft and the lowest order number wheel for reversing the direction of counting of the display revolution counter at successive first and second rotational positions of the input shaft respectively having a predetermined number of input shaft revolutions in a given direction therebetween, i.e., at predetermined extremities of the count.

The reversing mechanism comprises a first planetary gear train including a first pinion carrier connected to the input shaft and rotatable thereby, first and second spur gears coaxial with and on either side of the first pinion carrier, and a first pair of pinions carried by the first pinion carrier and respectively meshing with each other and with the first and second spur gears. A first locking member is secured to the first spur gear and is rotatable therewith. A second planetary gear train is provided including a second pinion carrier coaxial with the first pinion carrier, second and third spur gears coaxial with and on either side of the second pinion carrier, and a second pair of pinions carried by the second pinion carrier and respectively meshing with each other and with the third and fourth spur gears. The second spur gear of the first planetary gear train and the third spur gear of the second planetary gear train are connected for rotation in unison and a second locking member is provided secured to the second and third spur gears and rotatable therewith. A gear train is provided drivingly connecting the first and fourth spur gears and drive gears is provided coupling the second pinion carrier to the lowest order number wheel of the display counter for rotating the same.

First locking means is provided connected to the final transfer means and actuated thereby for engaging the first locking member and restraining the same and the first spur gear in response to the input shaft passing through its first rotational position, i.e., one extremity of the count, so that the second pinion carrier is rotated in one direction by the second and third spur gears, thereby rotating the lowest order number wheel in one direction, the first locking means disengaging the first locking member and releasing the same and the first spur gear in response to the input shaft passing through its second rotational position, i.e., the other extremity of the count. A second locking means is provided connected to the final transfer means and actuated thereby for engaging the second locking member and restraining the same and the second and third spur gears in response to the input shaft passing through its second rotational position, i.e., the other extremity of the count, so that the second pinion carrier is rotated in the opposite direction by the gear train, thereby rotating the lowest order number wheel in the opposite direction, the second locking means disengaging the second locking member and releasing the same and the second and third spur gears in response to the input shaft passing through its first position, i.e., the one extremity of the count.

The above mentioned and other features and objects of this invention and the manner of attaining them will become more apparent and the invention itself will be best understood by reference to the following description of an embodiment of the invention taken in conjunction with the accompanying drawings, wherein:

FIG. 3 is a cross-sectional view taken along the line 3—3 of FIG. 2;

FIG. 4 is a cross-sectional view taken along the line 4—4 of FIG. 2;

FIG. 5 is a cross-sectional view taken along the line 5—5 of FIG. 2;

FIG. 6 is a cross-sectional view taken along the line 6—6 of FIG. 2;

Figure 1:
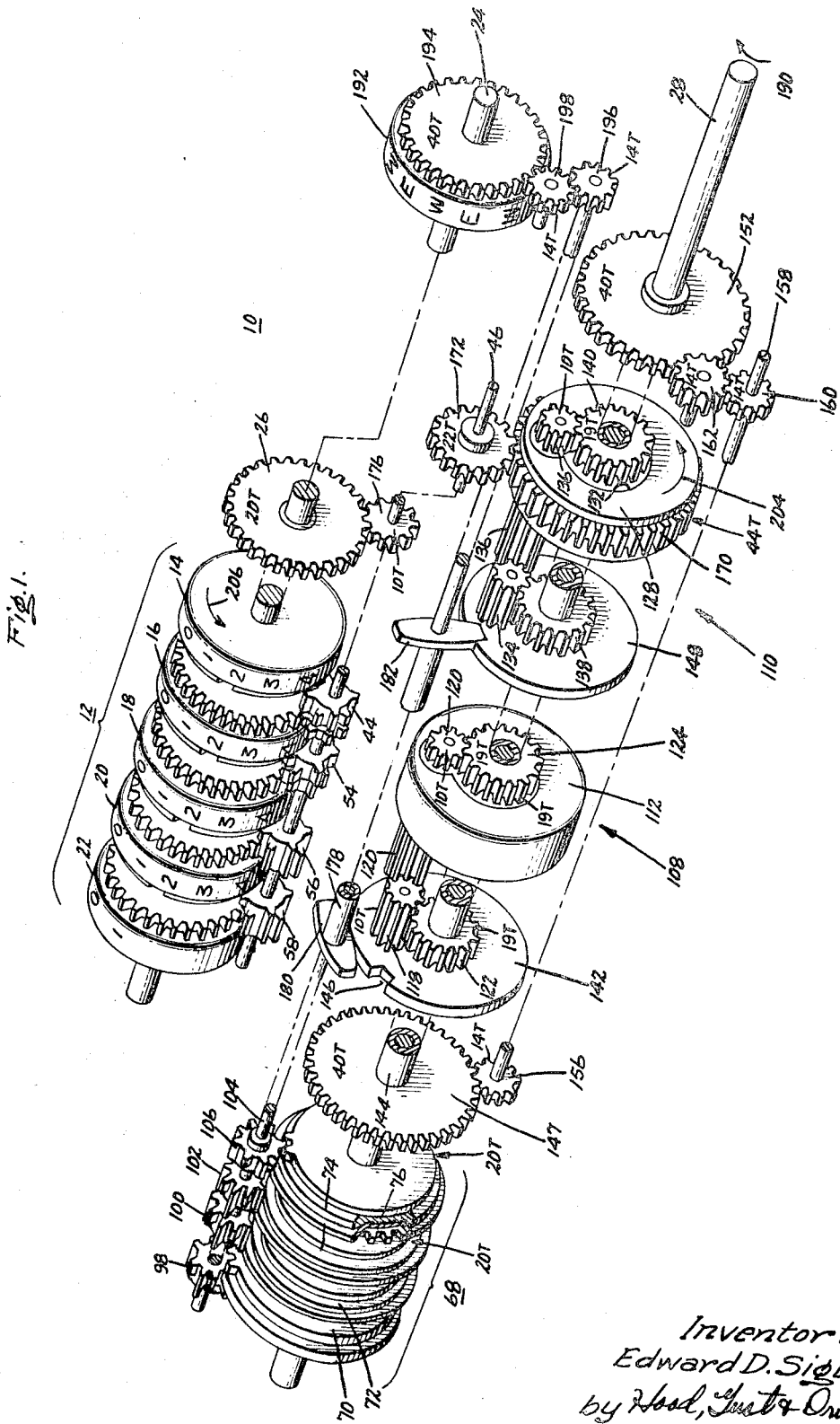
FIG. 1 is a schematic exploded perspective view of the reversing counter apparatus of the invention.

Referring now to the figures of the drawings, the improved automatically reversing counter apparatus of the invention, generally indicated at 10, which is adapted for use as a longitude counter and thus to display degrees of longitude from 000°00′ to 180°00′, comprises a display revolution counter 12 having successively higher order number wheels 14, 16, 18, 20 and 22 rotatably mounted on shaft 24. It will be observed that number wheel 16 has the digits from zero (0) to to five (5) displayed thereon and that number wheel 14 has the digits from zero (0) to nine (9) displayed thereon and thus that the number wheels 16, 14 display minutes from 00′ to 59′. It will be observed further that the number wheel 22 has the digits zero (0) and one (1) thereon and that the number wheels 20 and 18 respectively have the digits from zero (0) to nine (9) thereon, and thus it will be seen that the number wheels 22, 20, 18 display degrees from 000° to 180°.

The lowest order number wheel 14 has a spur gear 26 secured thereto for driving the same from the input shaft 28, as will be hereinafter described. In the illustrated embodiment, one revolution of input shaft 28 results in one revolution of the lowest order number wheel 14. Conventional intermittent motion-transfer mechanisms 30, 32, 34 and 36, respectively, interconnect the successively higher order number wheels 14 and 16, 16 and 18, 18 and 20, and 20 and 22 to advance each higher order number wheel a predetermined incremental amount in response to predetermined rotation of the next lower order number wheel. Transfer mechanism 30, comprises a conventional two-tooth gear 38 and cooperating locking cam 40 secured to number wheel 14, a full-tooth gear 42 secured to number wheel 16, and a mutilated pinion 44 rotatably mounted on shaft 46, pinion 44 having an eight-tooth segment cooperating with the two-tooth gear 38, a four-tooth segment cooperating with the locking cam 40 and an eight-tooth segment meshing with the full tooth gear 42. Thus, each complete revolution of the number wheel 14 results in advance of number wheel 16 by one digit. Transfer mechanism 32 comprises conventional two-tooth gear 48 and cooperating locking cam 50 secured to number wheel 16, full-tooth gear 52 secured to number wheel 18, and mutilated pinion 54 having an eight-tooth segment cooperating with the two-tooth gear 48, a four-tooth segment cooperating with locking cam 50 and an eight-tooth segment meshing with the full-tooth gear 52. Thus, each complete revolution of the number wheel 16 results in advance of number wheel 18 by one digit. Transfer mechanisms 34 and 36 similarly comprise two-tooth gears and cooperating locking cams respectively secured to number wheels 18, 20, full-tooth gears respectively secured to number wheels 20, 22, and mutilated pinions 56, 58 so that one complete rotation of number wheel 18 results in advance of number wheel 20 by one digit and one complete rotation of number wheel 20 results in advance of number wheel 22 by one digit.

A frame 60 is provided comprising a base member 62 and upstanding end members 64 and 66, the input shaft 28 and the shafts 24, 46 extending in spaced, parallel relationship between the end members 64, 66 and being journaled therein by suitable bearings which are shown here as being sleeve bearings but which may be conventional anti-friction bearings.

Timing revolution counter 68 is provided comprising progressively higher order timing wheels 70, 72, 74 and 76. Timing wheel 70 comprises a conventional two-tooth gear 78 and cooperating locking cam 80 mounted on and secured to the input shaft 28. Thus, each revolution of input shaft 28 results in one revolution of the lowest order timing wheel 70. Timing wheel 72 comprises a full-tooth gear 81, a two-tooth gear 82 and a cooperating locking cam 84. Timing wheel 74 comprises a full-tooth gear 86, a two-tooth gear 88 and a cooperating locking cam 80. Timing wheel 76 comprises a full-tooth gear 92, a two-tooth gear 94 and a cooperating locking cam 96. Conventional, intermittent motion-transfer mechanisms interconnect the progressively higher order timing wheels 70, 72, 74 and 76 and comprise mutilated pinions 98, 100 and 102.

Mutilated pinion 98 has an eight-tooth segment cooperating with the two-tooth gear 78, a four-tooth segment cooperating with locking cam 80 of timing wheel 70 and an eight-tooth segment meshing with the full-tooth gear 81 of timing wheel 72. Mutilated pinion 100 has an eight-tooth segment cooperating with the two-tooth gear 82, a four-tooth tooth segment cooperating with locking cam 84 of timing wheel 72 and an eight-tooth segment meshing with the full-tooth gear 86 of timing wheel 74. Similarly, mutilated pinion 102 has an eight-tooth segment cooperating with the two-tooth gear 88, a four-tooth segment cooperating with locking cam 90 of timing wheel 74 and an eight-tooth segment meshing with the full-tooth gear 92 of timing wheel 76. Mutilated pinions 98, 100 and 102 are respectively rotatably mounted on shaft 104 extending between and journaled in suitable bearings mounted in end members 64, 66 and frame 60. A pinion 106 is provided mounted on and secured to shaft 104 and having an eight-tooth segment cooperating with the two-tooth gear 94 and a four-tooth segment cooperating with locking cam 96 of timing wheel 76.

In the illustrated embodiment, full-tooth gear 42 on number wheel 16 is provided with twelve (12) teeth while the full-tooth gear 52 on number wheel 18 and the full-tooth gears on number wheels 20 and 22 are respectively provided with twenty (20) teeth. In the case of the timing counter 68, it is not necessary to display degrees and minutes as in the case of the display counter 12, it being only necessary that the highest order timing wheel 76 through its associated two-tooth gear 94 and locking cam 96 rotates the final eight-tooth pinion 106 through 90° to actuate the reversing mechanism when the count indicated by the display counter 12 approaches 000°00′ and 180°00′, respectively, i.e., the two extremities of the count. Thus, in the illustrated embodiment, full-tooth gears 81 and 86 respectively associated with timing wheels 72, 74 are provided with eighteen and twenty teeth, respectively, while full-tooth gear 92 associated with timing wheel 76 is provided with twenty-four teeth.

In order to provide reversal of the direction of counting of the display revolution counter 12 as it approaches the two extremities of the count, i.e., 000°00′ and 180°00′ as sensed of counted by the timing counter 68, first and second planetary gear trains 108, 110 are provided respectively mounted on the input shaft 28. The first planetary gear train 108 comprises a generally cylindrical pinion carrier 112 secured to the input shaft 28 for rotation therewith. Pinion carrier 112 has pockets 114, 116 formed in its opposite ends. Pinions 118, 120 are carried by the pinion carrier 112 and are respectively disposed in overlapping pockets 114, 116. A first spur gear 122 is provided rotatably mounted on input shaft 28 disposed in pocket 114 and meshing with pinion 118. A second spur gear 124 is provided mounted on sleeve 126 which in turn is rotatably mounted on input shaft 28, spur gear 124 being disposed in pocket 116 in the pinion carrier 112 and meshing with pinion 120. As best see in FIGS. 7 and 8, pinions 118, 120 respectively mesh with each other.

Figure 7:
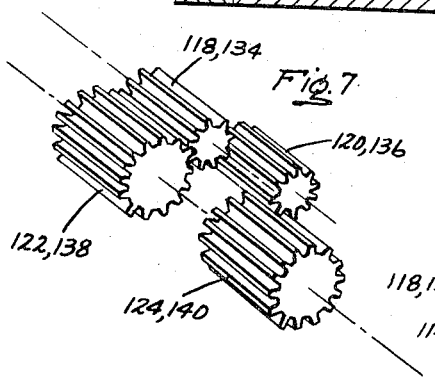
FIG. 7 is a fragmentary view in perspective showing the two differentials.
Figure 8:
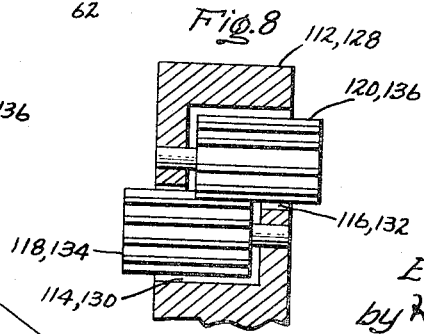
FIG. 8 is a fragmentary cross-sectional developed view further showing the two differentials.

The second planetary gear train 110 comprises a cylindrical pinion carrier 128 rotatably mounted on input shaft 28 and having overlapping pockets 130, 132 respectively formed in its opposite ends. Pinion carrier 128 carries pinions 134, 136 disposed in pockets 130, 132. A third spur gear 138 is secured on sleeve 126 and is disposed in pocket 130 meshing with pinion 134. It will thus be seen that spur gear 124 of planetary gear train 108 and spur gear 138 of planetary gear train 110 are secured together by way of sleeve 126 and thus rotate in unison. A fourth spur gear 140 is rotatably mounted on the shaft 28 and is disposed in pocket 132 to mesh with pinion 136. As shown in FIGS. 7 and 8, pinions 134, 136 mesh with each other.

A locking disc 142 is provided mounted on and secured to hub portion 144 of gear 122 so as to be adjacent the end of pinion carrier 112 in which pocket 114 is formed. Locking disc 142 has a cut-out portion 146 formed in its outer periphery for a purpose to be hereinafter described. A full-tooth gear 147 is also mounted on and secured to hub 144 of gear 122 abutting the locking disc 142. Another locking disc 148 is provided mounted on and secured to sleeve 126 between the spur gears 124, 138 so as to rotate therewith. Locking disc 148 is disposed between and adjacent the ends of pinion carriers 112, 128 in which pockets 116, 130 are respectively formed. Locking disc 148 has a cut-out portion 150 formed in its outer periphery for a purpose to be hereinafter more fully described. Another full-tooth spur gear 152 is mounted on and secured to hub portion 154 of spur gear 140 so as to be rotatable therewith and is adjacent the end of pinion carrier 128 in which pocket 132 is formed.

In the illustrated embodiment, spur gears 122, 124, 138 and 140 are each provided with fourteen (14) teeth, pinions 118, 120, 134 and 136 are each provided with ten (10) teeth, and spur gears 146 and 152 are each provided with forty (40) teeth.

Figure 2:
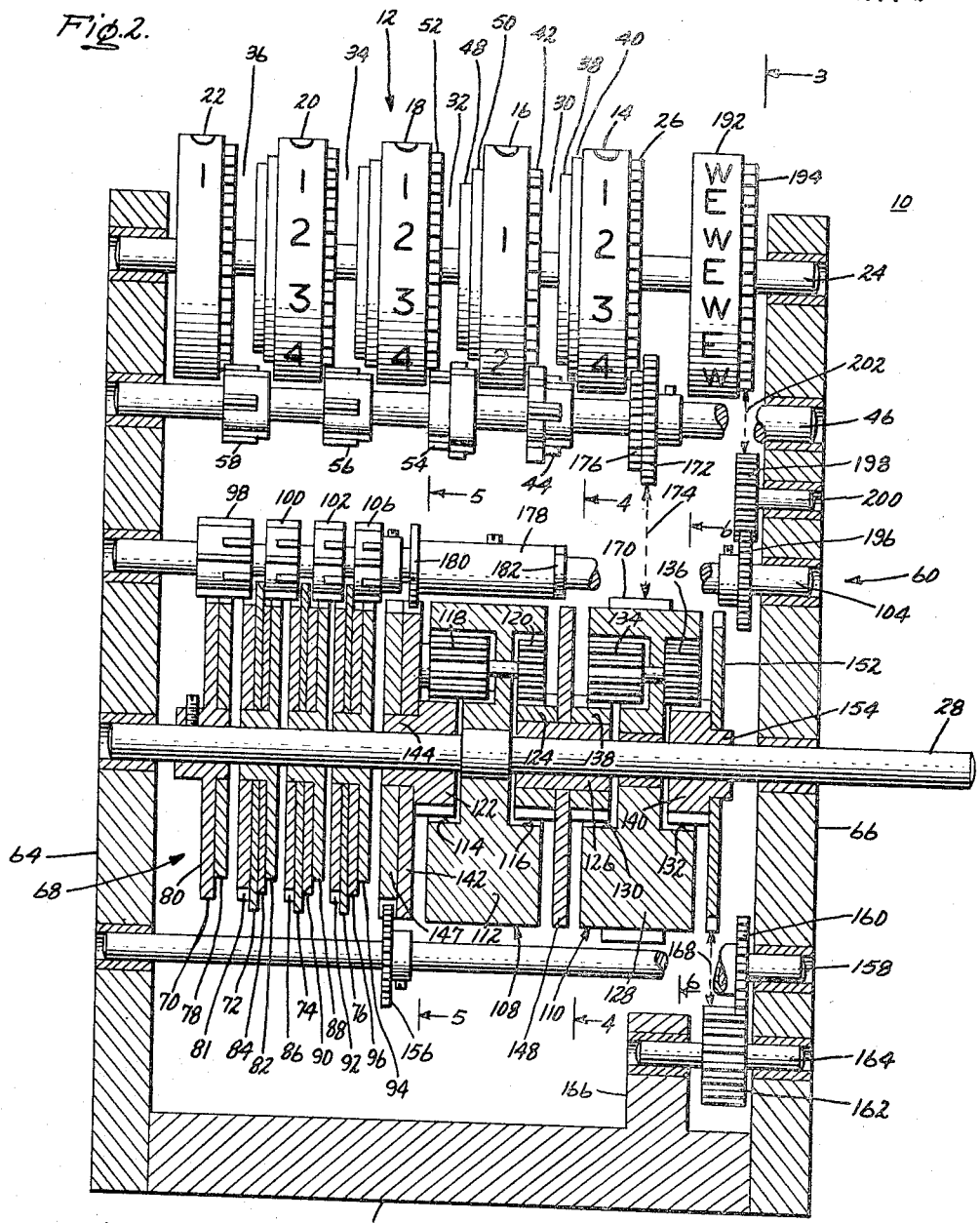
FIG. 2 is a side view, partly in cross-section and partly broken away, further showing the reversing counter apparatus of the invention.

A spur gear 156 is provided mounted on and secured to shaft 158 and meshing with the spur gear 147. It will be seen that shaft 158 is parallel with input shaft 28 and the other shafts 24, 46 and 104, extending between end members 64, 66, and being journaled therein in suitable bearings. Another spur gear 160 is mounted on and secured to shaft 158 and meshes with gear 162 mounted on shaft 164. Shaft 164 has one end journaled in end member 66 and its other end journaled in a suitable projection 166 extending upwardly from the base member 62. Gear 162 meshes with gear 152 as indicated by the dashed line 168 in FIG. 2 and as shown in FIG. 3. In the illustrated embodiment, gears 156, 160 and 162 are each provided with fourteen (14) teeth.

Spur gear teeth 170 are formed on the outer periphery of cylindrical pinion carrier 128. Spur gear 170 meshes with spur gear 172 mounted on pinion shaft 46, as shown by the dashed line 174 in FIG. 2, and as also shown in FIGS. 1 and 3. Another spur gear 176 is secured to gear 172 so as to rotate therewith and meshes with gear 26 on the lowest order number wheel 14. In the illustrated embodiment, spur gear 170 is provided with forty-four (44) teeth, gear 172 is provided with twenty-two (22) teeth, and gear 176 is provided with ten (10) teeth.

In order to restain one or the other of the locking discs 142, 148, a locking member 178 is provided mounted on and secured to shaft 104 so as to rotate therewith and with the pinion 106. Locking member 178 has a pair of locking dogs 180, 182 formed at its opposite ends. Locking dogs 180, 182 respectively have diametrically opposite extending projections 184, 186 and 188, 190. As best seen in FIGS. 1, 4 and 5, the axes of the projections of locking dogs 180, 182 are respectively disposed at right angles. As will be hereinafter more fully described, one of the projections of one of the locking dogs 180, 182 is at all times in engagement with the cut-out portion 146, 150 of the respective locking disc 142, 148 while the other locking dog is out of engagement with the cut-out portion of the other locking disc, as best seen in FIGS. 4 and 5. It is thus seen that when one of the projections 184, 186 of locking dog 180 is in engagement with the cut-out portion 146 of locking disc 142, locking disc 142 and spur gear 122 are restrained against rotation along with the gear train comprising the gears 156, 160 and 162, in turn restraining gear 152 and spur gear 140. Thus, rotation of input shaft 28 in the direction shown by the arrow 190 in FIG. 1 will result in driving pinion carrier 128 and its spur gear 170 in the same direction through spur gears 124, 138. However, if one of the projections 188, 190 of locking dog 182 is in engagement with cut-out portion 150 of locking disc 148, locking disc 148 together with spur gears 124, 138 will be restrained against rotation, whereas the restraint on locking disc 142 will be released so that continued rotation of input shaft 28 in the direction shown by the arrow 190 will result in rotation of pinion carrier 128 and its spur gear 170 in the opposite direction through spur gear 122 and the gear train comprising gear trains 147, 156, 160, 162 and 152 and spur gear 140. An indicating wheel 192 is provided rotatably mounted on shaft 24 and having spur gear 194 secured thereto so as to rotate therewith. Shaft 104 has a spur gear 196 mounted thereon and secured thereto so as to rotate therewith, gear 196 meshing with spur gear 198 mounted on shaft 200 journaled in end member 66. Gear 198 meshes, in turn, with gear 194 on indicator wheel 192, as shown by the dashed line 202 in FIG. 2 and as also shown in FIGS. 1 and 3. In the illustrated embodiment adapted for use as a longitude counter, indicator wheel 192 has a series of "E" and "W" indicia thereon respectively indicating "East" and "West" presentations. In the illustrated embodiment, gears 196 and 198 are each provided with fourteen (14) teeth and gear 194 is provided with thirty-five (35) teeth. It will be seen that each time eighth-tooth pinion 106 is rotated through 90° by engagement of two-tooth gear 94 therewith, indicator wheel 192 will be rotated to change the indication from "W" to "E" or vice versa as the case may be.

In operation, assuming that the counter is reading

00°03′ with a "W" indication with input shaft 28 being rotated in the direction 190 so as to decrease the reading toward 000°00′, locking dog 182 will be in engagement with cut-out portion 150 and of locking disc 148, thus restraining spur gears 124 and 138, and locking dog 180 will be out of engagement with cut-out portion 146 of locking disc 142. Thus, continued rotation of input shaft 28 in the direction 190 will drive pinion carrier 128 and its spur gear 170 in the direction shown by the arrow 204 in FIG. 1 through spur gear 122 and the gear train comprising gears 147, 156, 160, 162 and 152 and spur gear 140. Rotation of pinion carrier 128 and spur gear 170 in the direction shown by the arrow 204 will result in rotation of the lowest order number wheel 114 on the display counter 12 in the direction shown by the arrow 206 through gears 172, 176 and 26. When the input shaft 28 has been rotated in the direction 190 to the point where the reading is nearly 000°00′, two-tooth gear 94 will engage eight-tooth pinion 106 to rotate the same and the locking dogs 180, 182 90° in the direction shown by the arrows 208 in FIGS. 4 and 5. This 90° rotation of locking dogs 180, 182 results in locking dog 182 becoming disengaged with the cut-out portion 150 of locking disc 148, thus releasing the restraint on locking disc 148 and spur gears 124, 138, and locking dog 180 moving into engagement with cut-out portion 146 of locking disc 142, thus restraining the same along with spur gear 122 and the gear train comprising gears 147, 156, 160, 162 and 152 and the spur gear 140. This 90° rotation of the eight-tooth pinion 106 likewise rotates gears 196, 198 and 194 to rotate indicator wheel 192 in the direction shown by the arrow 210 in FIG. 3 to change from the "W" to the "E" indication. Continued rotation of input shaft 28 in the direction shown by arrow 190 will result in reversed rotation of the lowest order number wheel 14 to provide an increasing count toward 180°00′.

When input shaft 28 has been rotated in the direction 190, a sufficient number of revolutions to bring the count displayed on the display counter 12 to an amount approaching 180°00′, i.e., between 59′ and 00′, eight-tooth pinion 106 will again be rotated by 90° by two-tooth gear 94 so as to disengage locking dog 180 from cut-out portion 146 of locking disc 142 and again to engage locking dog 182 with cut-out portion 150 of locking disc 148, indicator wheel 192 again being advanced to change from the "E" to the "W" indication. With the continued rotation of input shaft 28 in the direction 190, the direction of rotation of pinion carrier 128 and its spur gear 170 together with the direction of rotation of the lowest order number wheel 14 and thus the direction of counting will again be reversed so as to count down from 180°00′ toward 000°00′.

A study of the reversing counter apparatus described above will reveal that 18° of input shaft rotation is required to effect reversal of the count. In the preferred embodiment, the timing counter 68 is phased so that at the 000°00′ extremity, reversal is initiated 9° of input shaft rotation short of the 00′ indication and thus likewise terminated 9° of input shaft rotation away from the 00′ indication toward the 59′ indication. It is thus seen that there is no loss of count during the reversal operation since the 18° of input shaft rotation required to effect reversal is absorbed in the rotation which normally would be required to rotate the lowest order number wheel 14 by 9° to the full 00′ indication and to rotate it back by 9°. Initiation of the reversal at the other extremity is likewise initiated 9° of input shaft rotation short of the 180°00′ indication, i.e., 27° of input shaft rotation beyond the 179°59′ indication.

It will now be seen that the reversing counter of this invention utilizes spur gearing exclusively, such gearing being readily machined with great precision in miniature sizes. Thus, a reversing counter incorporating the invention can be provided in extremely miniaturized form and capable of extremely high speed operation by reason of the exclusive use of high precision external gearing.

While there have been described above the principles of this invention in connection with specific apparatus, it is to be clearly understood that this description is made only by way of example and not as a limitation to the scope of the invention.

What is claimed is:

1. In a reversing revolution counter apparatus comprising an input shaft adapted for continuous rotation in either direction; a display revolution counter for counting and indicating revolutions of said input shaft and including a plurality of successively higher order number display wheels, and a first plurality of intermittent motion transfer means respectively interconnecting said number wheels for advancing each successive higher order number wheel a predetermined incremental amount in response to predetermined rotation of the respective next lower order number wheel, a timing revolution counter for counting revolutions of said input shaft including a plurality of successively higher order timing wheels, a second plurality of intermittent motion transfer means respectively interconnecting said timing wheels for advancing each successive higher order timing wheel a predetermined incremental amount in response to predetermined rotation of the respective next lower order timing wheel, a final intermittent motion transfer means coupled to the highest order timing wheel for providing a predetermined rotational movement in response to predetermined rotation of said highest order timing wheel, said input shaft being coupled to the lowest order timing wheel for rotating the same; reversing mechanism coupling said input shaft and said lowest order number wheel for reversing the direction of counting of said display revolution counter at successive first and second rotational positions of said input shaft respectively having a predetermined number of input shaft revolutions in a given direction therebetween comprising a first planetary gear train including a first pinion carrier connected to said input shaft and rotatable thereby, first and second spur gears coaxial with and on either side of said first pinion carrier, and a first pair of pinions carried by said first pinion carrier and respectively meshing with each other and with said first and second spur gears; a first locking member secured to said first spur gear and rotatable therewith; a second planetary gear train including a second pinion carrier coaxial with said first pinion carrier, third and fourth spur gears coaxial with and on either side of said second pinion carrier, and a second pair of pinions carried by said second pinion carrier and respectively meshing with each other and with said third and fourth spur gears, said second and third spur gears being connected for rotation in unison; a second locking member secured to said second and third spur gears and rotatable therewith; a gear train drivingly connecting said first and fourth spur gears; drive means coupling said second pinion carrier to the lowest order number wheel for rotating the same; first locking means connected to said final transfer means and actuated thereby for engaging said first locking member and restraining the same and said first spur gear in response to said input shaft passing through a said first position whereby said second pinion carrier is rotated in one direction by said second and third spur gears thereby rotating said lowest order number wheel in one direction, said first locking means disengaging said first locking member and releasing the same and said first spur gear in response to said input shaft passing through a said second position; and second locking means connected to said final transfer means and actuated thereby for engaging said second locking member and restraining the same and said second and third spur gears in response to said input shaft passing through a said second position whereby said second pinion carrier is rotated in the opposite direction by said gear train thereby rotating said lowest order number wheel in the opposite direction, said second locking means disengaging said second locking member and releasing the same and said second and third spur gears in response to said input shaft passing through a said first position.

2. The counter of claim 1 wherein said first pinion carrier is mounted on and secured to said input shaft and said second pinion carrier and said spur gears are rotatably mounted on said input shaft.

3. The counter of claim 1 wherein said drive means comprises a spur gear on said second pinion carrier, and gear means drivingly connecting said last-named spur gear to said lowest order number wheel.

4. The counter of claim 1 wherein said second locking member is disposed between said second and third spur gears.

5. The counter of claim 1 wherein said first pinion carrier comprises a cylindrical member having opposite ends with overlapping pockets respectively formed therein, said first pair of pinions and said first and second spur gears being respectively disposed in said first pinion carrier pockets, wherein said second pinion carrier comprises a cylindrical member having opposite ends with overlapping pockets respectively formed therein, said second pair of pinions and said third and fourth spur gears being respectively disposed in said second pinion carrier pockets, and wherein said drive means comprises a spur gear formed on the outer periphery of said second pinion carrier, and gear means drivingly connecting said last-named spur gear to said lowest order number wheel.

6. The counter of claim 5 wherein said first locking member comprises a first disc adjacent one end of said first pinion carrier and having a cutout locking portion in its outer periphery, wherein said second locking member comprises a second disc disposed between said second and third spur gears and respectively between the other end of said first pinion carrier and one end of said second pinion carrier, said second disc having a cutout locking portion in its outer periphery, wherein said gear train includes a fifth spur gear coaxial with and adjacent said first disc and a sixth spur gear coaxial with and adjacent the other end of said second pinion carrier, and wherein each of said first and second locking means comprises a dog member having diametrically oppositely extending projections respectively adapted cooperatively to mesh with the cutout portion of the respective disc, said dog members being secured to said final timing transfer means and rotatable therewith, said dog members being disposed with the axes of their respective projections at right angles.

7. The counter of claim 1 wherein said number wheels are rotatably mounted on a first shaft spaced from and parallel with said input shaft, said first plurality of transfer means being rotatably mounted on a second shaft spaced from and parallel with said first and input shafts, said first pinion carrier being mounted on and secured to said input shaft, said second pinion carrier and said first, second, third and fourth spur gears being rotatably mounted on said input shaft, the lowest order timing wheel being mounted on and secured to said input shaft and the remaining timing wheels being rotatably mounted on said input shaft, said second plurality of transfer means being rotatably mounted on a third shaft spaced from and parallel with said first and second shafts and said input shaft, said final transfer means being mounted on said third shaft, said first pinion carrier comprising a cylindrical member having opposite ends with overlapping pockets respectively formed therein, said first pair of pinions and said first and second spur gears being respectively disposed in said first pinion carrier pockets, said second pinion carrier comprising a cylindrical member having opposite ends with overlapping pockets respectively formed therein, said second pair of pinions and said third and fourth spur gears being respectively disposed in said second pinion carrier pockets, said drive means comprising a fifth spur gear formed on the outer periphery of said second pinion carrier, a sixth spur gear on said first shaft and connected to said lowest order number wheel, and gearing on said second shaft and meshing with said fifth and sixth spur gears, said first locking member comprising a first disc coaxially mounted on said first spur gear adjacent one end of said first pinion carrier and having a cutout locking portion formed in its outer periphery, said second locking member comprising a second disc between said second and third spur gears and coaxially mounted thereon, said second disc being respectively adjacent the other end of said first pinion carrier and one end of said second pinion carrier and having a cutout locking portion formed in its outer periphery, said gear train comprising a seventh spur gear coaxially mounted on said first spur gear and adjacent said first disc, an eighth spur gear coaxially mounted on said fourth spur gear and adjacent the other end of said second pinion carrier, and gearing drivingly connecting said seventh and eighth spur gears, said first and second locking means comprising a pair of dog members respectively mounted on said third shaft and secured to said first transfer means for rotation therewith, each of said dog members having diametrically oppositely extending projections respectively adapted cooperatively to mesh with the cutout portion of the respective disc, said dog members being disposed with the axes of their respective projections at right angles.

References Cited
UNITED STATES PATENTS

| | | | |
|---|---|---|---|
| 3,097,793 | 7/1963 | Mitchell et al. | 235—103 |
| 3,129,599 | 4/1964 | Olson | 235—103 |
| 3,190,552 | 6/1965 | Devanney | 235—132 |

RICHARD B. WILKINSON, *Primary Examiner.*

L. R. FRANKLIN, *Assistant Examiner.*

UNITED STATES PATENT OFFICE
CERTIFICATE OF CORRECTION

Patent No. 3,334,811                          August 8, 1967

Edward D. Sigl

It is hereby certified that error appears in the above numbered patent requiring correction and that the said Letters Patent should read as corrected below.

Column 1, line 59, for "The" read -- That --; column 2, line 69, for "gears", second occurrence, read -- means --; column 4, line 46, for "80" read -- 90 --; column 5, line 20, for "of" read -- or --; line 34, for "see" read -- seen --; column 6, line 22, for "restain" read -- restrain --; column 7, line 4, strike out "and"; line 35, after "of" insert -- pinion carrier 128 and its spur gear 170 through spur gears 124-138, resulting in turn in reversed rotation of --.

Signed and sealed this 27th day of August 1968.

(SEAL)
Attest:

Edward M. Fletcher, Jr.                        EDWARD J. BRENNER

Attesting Officer                              Commissioner of Patents